United States Patent [19]

Rudy

[11] Patent Number: 4,979,526

[45] Date of Patent: Dec. 25, 1990

[54] METHOD AND MANUFACTURE FOR REMOVING WALLPAPER

[76] Inventor: Gus J. Rudy, 6652 E. Delmon Dr., Mesa, Ariz. 85205

[21] Appl. No.: 299,226

[22] Filed: Jan. 23, 1989

[51] Int. Cl.[5] .............................. B08B 7/00; C09J 7/02

[52] U.S. Cl. .............................. 134/4; 428/346; 428/351; 428/318.4; 428/904.4; 156/344

[58] Field of Search .................. 427/336; 428/43, 346, 428/351, 318.4, 904.4; 134/4; 156/344

[56] References Cited

U.S. PATENT DOCUMENTS

| | | | |
|---|---|---|---|
| 137,396 | 4/1873 | Ware | 156/344 |
| 1,070,241 | 8/1913 | Fischer | 156/344 |
| 1,083,007 | 12/1913 | Ellis | 156/344 |
| 2,221,960 | 11/1940 | Abramowitz | 156/344 |
| 2,495,729 | 1/1950 | Hutson | 134/4 |
| 3,149,364 | 9/1964 | Baptist | 134/4 |
| 3,574,656 | 6/1967 | Sauntson | 428/904.4 |
| 3,715,264 | 2/1973 | Burton | 161/82 |
| 4,361,452 | 11/1982 | Clarke | 156/71 |
| 4,834,803 | 5/1989 | Knowlton | 134/4 |

FOREIGN PATENT DOCUMENTS

| | | | |
|---|---|---|---|
| 3427484 | 2/1986 | Fed. Rep. of Germany | 156/344 |
| 234645 | 4/1986 | Fed. Rep. of Germany | 156/344 |

OTHER PUBLICATIONS

"The Hang of Wallpapering", Tom Riley, Popular Mechanics, Mar. 1954, pp. 177–182.

"How to Remove Old Wall Paper", Scientific American, Jan. 25, 1913.

*Primary Examiner*—Asok Pal

*Assistant Examiner*—Ourmazd S. Ojan

*Attorney, Agent, or Firm*—Fulwider, Patton, Lee & Utecht

[57] ABSTRACT

Wallpaper is removed by contacting the wallpaper with a liquid composition which permeates the paper and softens the adhesive which holds the wallpaper to a wall. A vapor barrier is applied to the liquid contacted wallpaper which prevents evaporation of the liquid and maintains continuous contact between the liquid and the wallpaper until the adhesive is softened, after which the wallpaper is stripped away from the wall surface. An article of manufacture for protecting one embodiment of this method includes a vapor barrier sheet having open-celled interstices on one side thereof and a dry composition carried in the interstices. The dry composition forms a gel when contacted with a paper-permeating, adhesive-softening liquid.

4 Claims, 1 Drawing Sheet

METHOD AND MANUFACTURE FOR REMOVING WALLPAPER

This invention pertains to removal of wallpaper.

More particularly, the invention concerns a method for removing liquid-permeable wallpaper which is adhesively secured to a wall surface.

In another respect, the invention pertains to a new article of manufacture for removing such wallpaper.

For many years various papers, fabrics and the like have been applied as decorative coverings for interior walls of residences, office buildings and similar structures. Such "wallpapers" are secured to wall surfaces by a paste or similar adhesive which air dries or cures to secure the wallpaper to the wall surface.

When re-decorating, it is best practice to remove existing wallpaper before applying new wallpaper or painting an exposed wall surface. Such removal operation can actually consume more time and effort than the re-decorating procedures which follow. Many methods and compositions have been proposed for removing old wallpaper, most of which involve application of a liquid composition which soaks through the wallpaper and softens the paste to make it easier to remove the old wallpaper by peeling it or scraping it away from the wall. Such liquid compositions have varied in consistency from a runny liquid to a stiff gel. However, the prime objective is to maintain the liquid in contact with the wallpaper long enough to soak through the paper and soften the adhesive before the removal composition dries by evaporation of the liquid components.

In an attempt to maintain better contact of the liquid composition with the wallpaper, the softening liquid component has been incorporated into gels which resist displacement after they are applied, as by running down the wall. Such gels have been used to some effect but, generally, the removal of old wallpaper still presents a tiresome, difficult and time consuming task.

It would be highly advantageous to provide a method and manufacture for removing wallpaper which functions more effectively to cause uniform softening of the paste or other adhesive securing old wallpaper to a wall surface, such that the time and effort for removing the paper can be improved.

Accordingly, the principal object of the present invention is to provide an improved method and manufacture for removing wallpaper.

Yet another object of the invention is to provide such a method in which the adhesive-softening liquid is more efficiently maintained in contact with a used wallpaper surface, to cause softening of the adhesive, before the softening liquid evaporates.

Still another object of the invention is to provide an article of manufacture which is specially adapted to the practice of my improved method and which can be used by persons of limited experience and skills.

BRIEF DESCRIPTION OF DRAWINGS

These, other and more specific objects and advantages of my invention will be apparent to those skilled in the art from the following detailed description thereof, taken in conjunction with the drawings, in which.

Briefly, in accordance with one preferred embodiment of my invention, I provide a method for removing liquid-permeable wallpaper which is adhesively secured to a wall surface. My method comprises the steps of contacting the wallpaper with a liquid composition which permeates the wallpaper and softens the adhesive, applying a vapor barrier to the liquid-contacted wallpaper surface to prevent evaporation of the liquid and maintain continuous contact between the liquid and the wallpaper until the adhesive is softened, and stripping the wallpaper away from the wall surface.

According to another preferred embodiment of my invention I provide a new article of manufacture for removing liquid-permeable wallpaper from a wall surface. This manufacture comprises a vapor barrier sheet having open-cell interstices on one side thereof, dimensioned to be applied to and overlie a wallpaper surface. A dry composition is carried in the interstices of the vapor barrier sheet. This composition forms a gel when contacted with a paper-permeating, adhesive-softening liquid.

Figure 1:
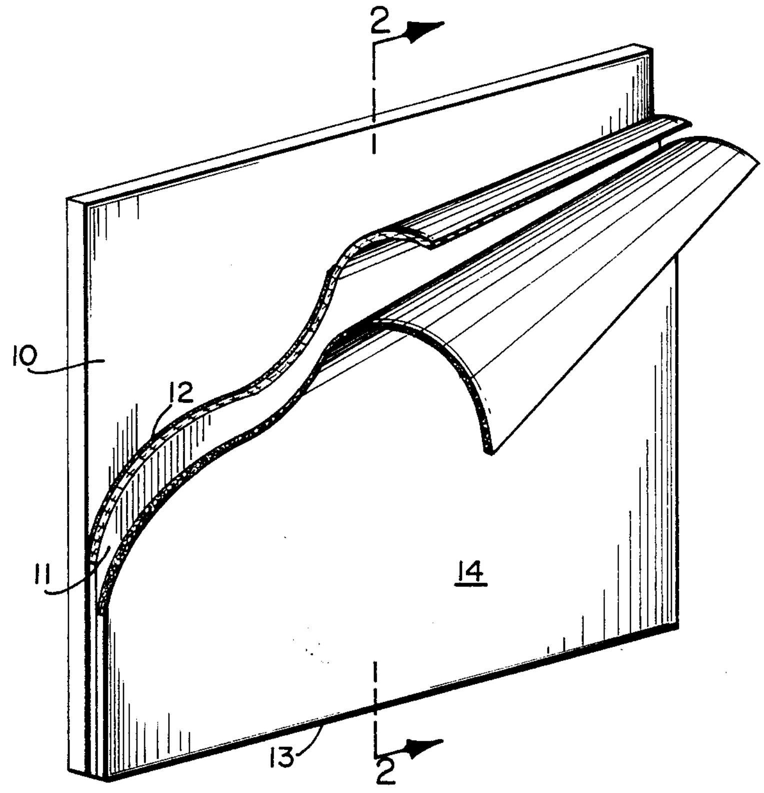
FIG. 1 is a partially cut-away prospective view of a wall, wallpaper adhesively secured thereto, and the manufacture of the invention, shown spaced from the wall, just prior to application.
Figure 2:
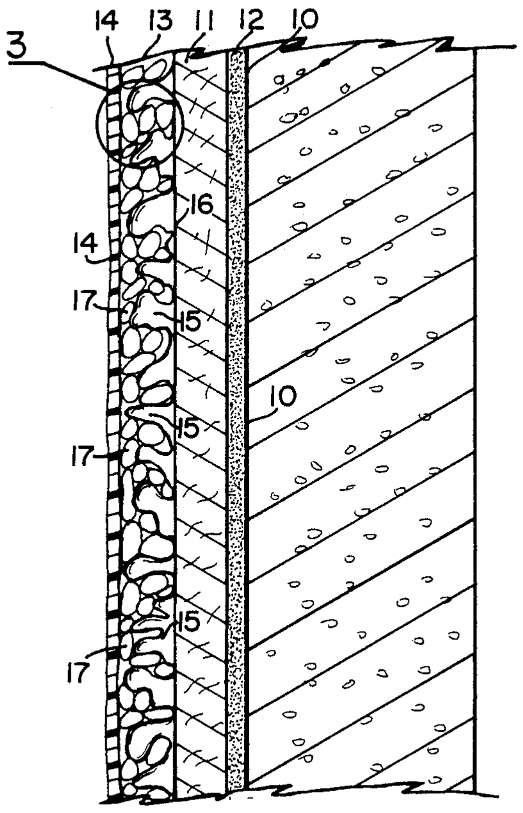
FIG. 2 is a sectional view of the wall of FIG. 1 taken along section line 2—2 thereof, after application of the manufacture to the wall.

Turning now to the drawings, in which like referenced characters identify the same elements in the several views, FIG. 1-2 depicts a typical wallpaper surface 10 having wallpaper 11 secured thereto by adhesive 12.

Figure 3:
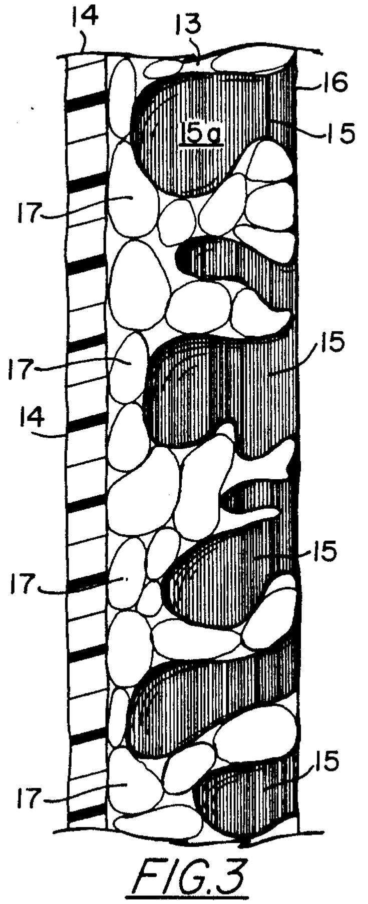
FIG. 3 is a sectional view of the manufacture of FIGS. 1-2 as supplied to the user, prior to activation of the gel-forming composition.

As seen more clearly in FIGS. 2-3, a vapor barrier sheet 13 is provided which is sized to overlie the wallpaper surface 10. The vapor barrier sheet can conveniently be formed of a foamed plastic material, one side 14 of which is a continuous vapor barrier and the other side of which comprises a cellular structure having open cell interstices 15, communicating with the opposite surface 16. The remainder of the sheet 13 is comprised of closed celled material 17 which provides substantial mechanical strength for the sheet 13.

As shown in FIG. 3, the interstices 15 are initially filled with a dry gel-forming composition by impregnating the sheet 13 with an aqueous slurry of the dry components and then drying the structure, leaving the solid materials deposited and carried in the interstices 15. In this form the sheet 13 can be supplied in rolls to the end user.

In use, the sheet of FIG. 3 is "activated" by dipping, spraying or otherwise applying a suitable adhesive softening liquid which causes the dried materials in the interstices 15 to form a liquid-containing gel. At this point, as shown in FIG. 2, the activated sheet can be applied directly to the wallpaper 11. The activated sheet is left in place until liquid in the gel permeates the wallpaper 11 and softens the adhesive 12, at which point the vapor barrier 13 and paper 11 can be removed from the wall surface 10 by simply peeling them away in the direction of the arrow A.

A suitable liquid composition for practicing my method consists of:

TABLE I

| Component | % by Weight |
|---|---|
| ethylene glycol | 9 |
| methyl cellulose | 18 |

TABLE I-continued

| Component | % by Weight |
| --- | --- |
| water | 73 |

Alternative gel-type compositions are also disclosed in the prior art and will be readily known and understood by persons skilled in this art. For example, see the patent to Hutson, U.S. Pat. No. 2,495,729.

A suitable dry powder composition which can be impregnated into the vapor barrier sheet of FIG. 3, is, for example, disclosed in the Crotty patent U.S. Pat. No. 3,578,499.

In addition to the steps and techniques described above, my invention also comprehends separately applying the gel directly to the surface of the wallpaper followed by application of a continuous vapor barrier sheet such as a polyethylene film, preferably textured.

Having described my invention in such terms as to enable those skilled in the art to which it pertains to understand and practice it, and having described the presently preferred embodiments thereof, I claim:

1. A method for removing liquid-permeable wallpaper adhesively secured to a wall surface, comprising the steps of:

(a) contacting said wallpaper with a liquid composition which permeates said wallpaper and softens said adhesive;

(b) applying a sheet material vapor barrier in interfacing contiguous contact to said liquid contacted wallpaper surface to prevent evaporation of said liquid and maintain continuous contact between said liquid and said wallpaper until said adhesive is softened; and (c) substantially simultaneously stripping both said sheet material vapor barrier and said wallpaper away from said wall surface.

2. The method as recited in claim 1 where the step of applying a sheet material vapor barrier includes the step of applying a sheet material formed of a foamed plastic material composition.

3. The method as recited in claim 2 where the step of applying a foamed plastic vapor barrier includes the step of applying sheet material having a first side with a closed cell structure defining a continuous vapor barrier and a second side having a cellular structure defined by a plurality of open cell interstices.

4. A new article of manufacture for removing liquid-permeable wallpaper from a wall surface, said manufacture comprising:

(a) a vapor barrier sheet formed of a foamed plastic material having open-cell interstices on one side and a closed cell structure on an opposing side thereof, said vapor barrier sheet being dimensioned to be applied to and overlie a wallpaper surface for preventing evaporation of a paper-permeating, adhesive-softening liquid composition applied thereto; and (b) a dry composition carried in the interstices of said sheet, which composition forms a gel when contacted with said paper-permeating, adhesive-softening liquid.

* * * * *